UNITED STATES PATENT OFFICE.

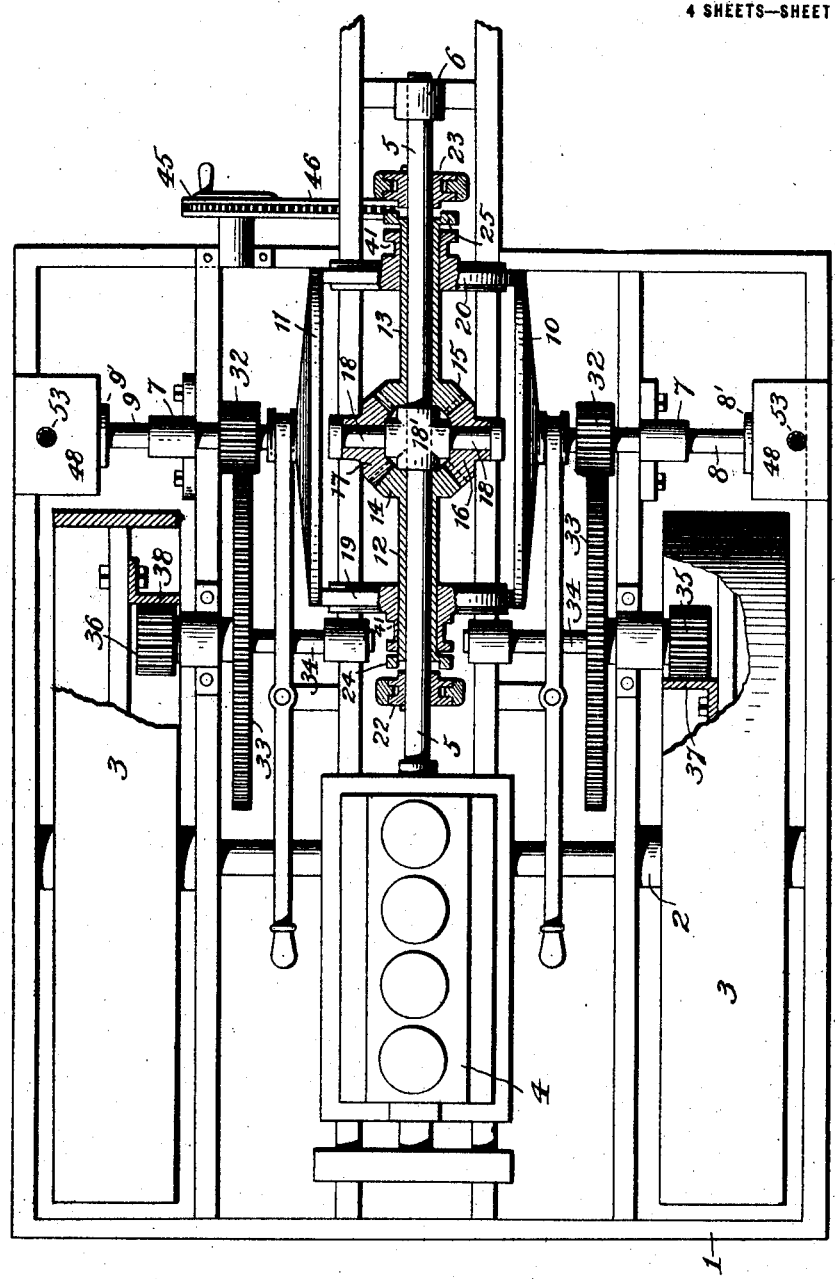

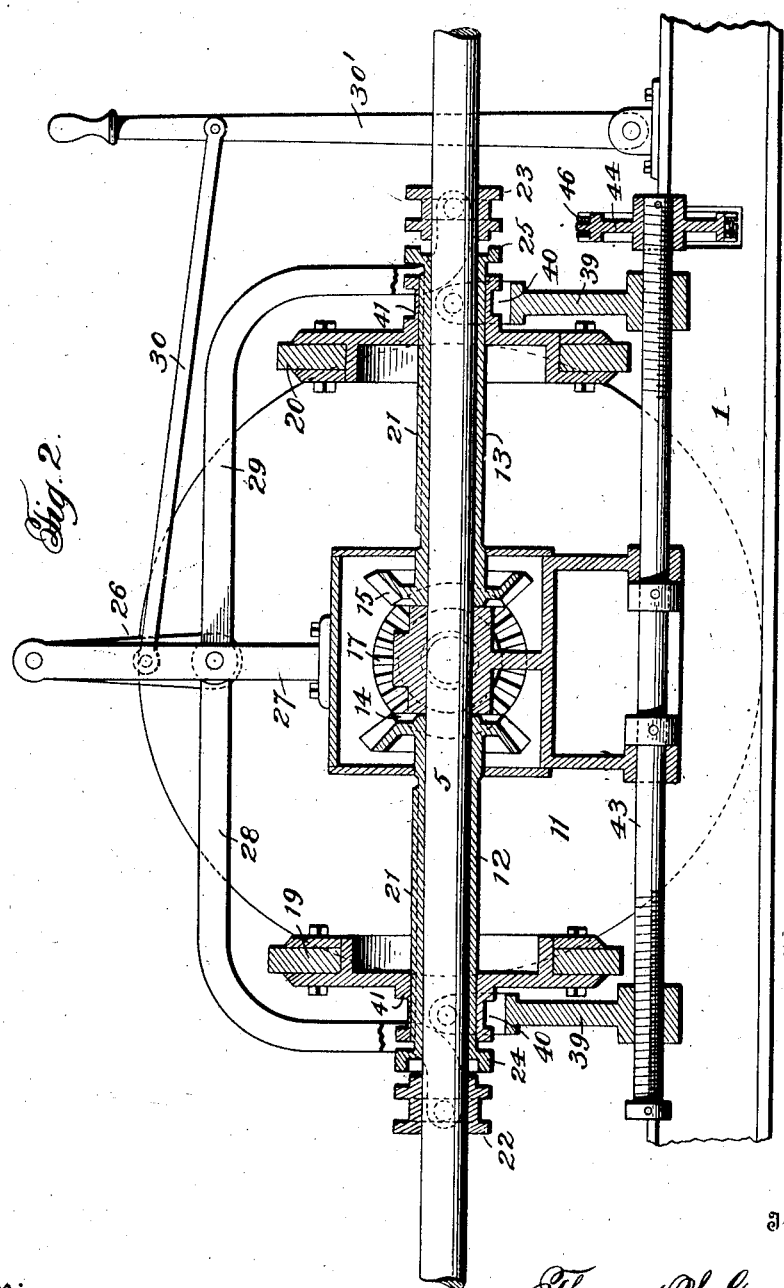

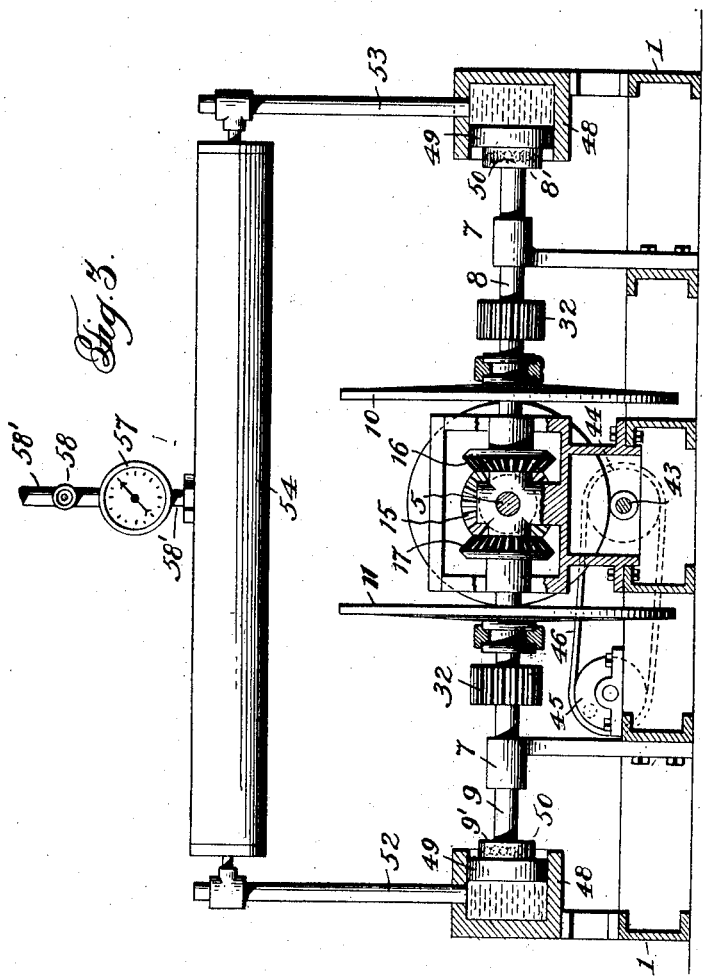

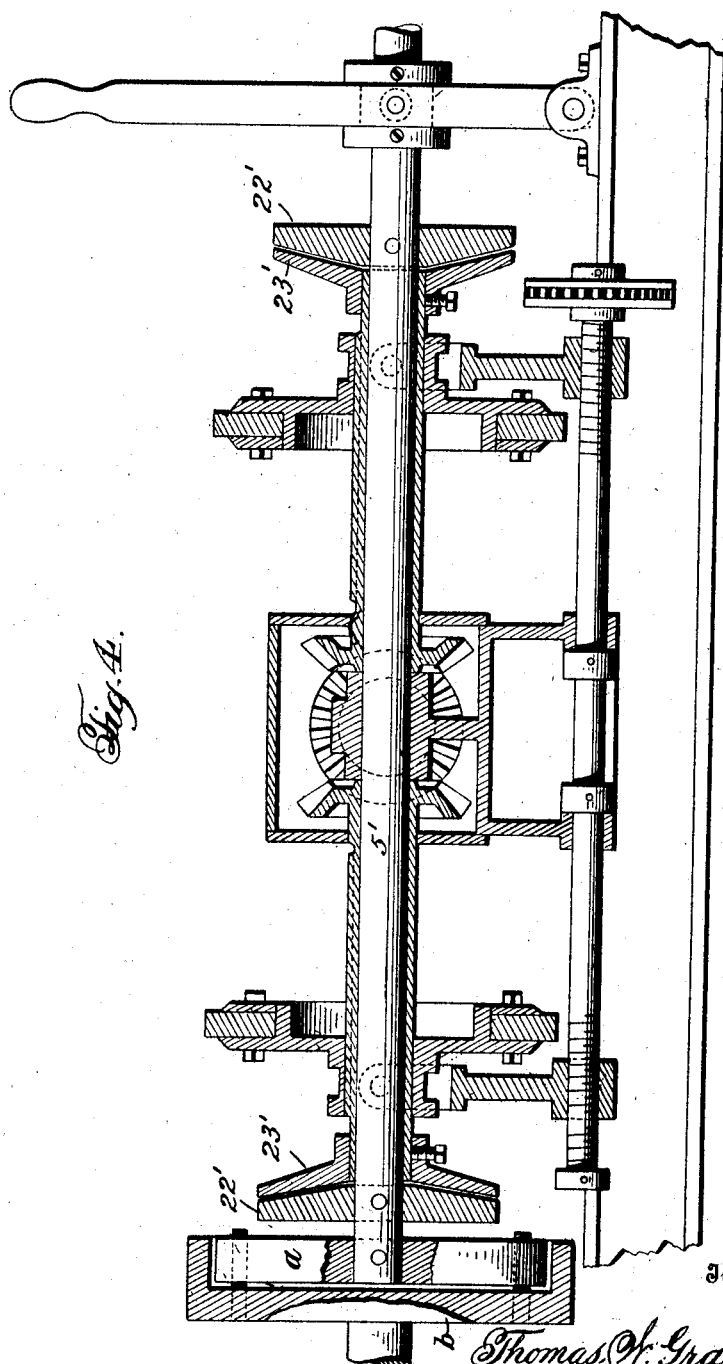

THOMAS W. GRAHAM, OF GROVER, COLORADO.

FRICTION POWER-TRANSMISSION MECHANISM.

1,330,526.  Specification of Letters Patent.  Patented Feb. 10, 1920.

Application filed May 14, 1918. Serial No. 234,481.

*To all whom it may concern:*

Be it known that I, THOMAS W. GRAHAM, a citizen of the United States, residing at Grover, in the county of Weld and State of Colorado, have invented certain new and useful Improvements in Friction Power-Transmission Mechanism, of which the following is a specification, reference being had therein to the accompanying drawing.

This invention relates to improvements in friction power transmission mechanism susceptible of use for various purposes though particularly adapted for driving farm tractors or the like.

The object of the invention is to provide an improved friction power transmission in which the driving contact and strain incident thereto is applied equally to the driven disk or disks upon opposite sides of their axes of rotation to prevent or reduce any tendency of the driven and driving elements from shifting from their normal positions out of driving contact, reducing the friction and strain between the driving and driven shafts and their bearings, and affording a more efficient friction drive.

Another object of the invention is to provide in a power transmission mechanism of the character referred to, simple and efficient means providing for reversing the direction of the drive while maintaining the driving and driven elements in operative engagement.

My present invention is designed primarily as an improvement on the construction shown in my application Serial No. 113,528 filed August 7, 1916.

The invention comprehends the use of a single or continuous power shaft, a pair of driving wheels connected together for rotation in opposite directions, means for coupling either of said driving wheels to the power shaft for rotation therewith, and a driven disk or pair of disks arranged in axial alinement, said pair of driving wheels being arranged in axial alinement and operatively engaging the driven disk or pair of disks at opposite sides of their axes of rotation.

A further object of the invention is to provide improved means for yieldably maintaining operative contact between the driving members or wheels and the driven disk or pair of disks.

The invention, with other objects and advantages thereof and the particular construction, combination and arrangement of parts comprising the same will be understood from the hereinafter contained detail description when considered in connection with the accompanying drawings forming part hereof and illustrating one embodiment of the invention.

In the drawings:

Figure 1 is a top plan view of the power transmission applied to a tractor, the tractor construction being only illustrated in a general way.

Fig. 2 is a detail longitudinal sectional view of the power transmission.

Fig. 3 is an end elevation of the power transmission, with parts in section, and also illustrating the means for yieldably maintaining the driven disks in driving contact with the pair of driving wheels.

Fig. 4 is a detail longitudinal sectional view illustrating a slightly modified construction of the power transmission.

In the drawings I have illustrated, by way of example, one embodiment of the invention, the power transmission being shown applied to a farm tractor or the like. I desire it to be understood, however, that changes and variations in the particular construction illustrated in the drawing and the carrying out of the invention in other forms and in connection with other devices may be practised without departing from the spirit of the invention.

Referring to a detail description of the drawings wherein like reference characters designate corresponding parts throughout the several views, the frame of the tractor shown is substantially rectangular shaped and has the usual spaced longitudinal members 1. 2 designates the stationary axle at the rear of the frame and 3 the rear wheels. 4 designates the motor, which is preferably of the internal combustion type, and 5 the power shaft extending forwardly from the motor and supported at its forward end in a bearing 6 toward the forward portion of the frame.

Supported for rotation in bearings 7 on the intermediate members 2 of the frame are counter or driven shafts 8 and 9, said shafts being arranged in axial alinement and spaced from each other at their inner ends. Fixedly secured to said shafts at the inner ends thereof are a pair of driven friction disks 10—11. Loosely mounted upon the power shaft 5 are two sleeves 12—13, said sleeves being connected together for rotation in opposite directions by gearing of any suitable construction, in this instance, shown as consisting of beveled pinions 14—15 fixed to the respective sleeves at the inner ends thereof and meshing with beveled pinions 16—17 supported for rotation on studs 18 carried by a bearing sleeve 18' and projecting laterally at opposite sides of the power shaft 5. Mounted upon the sleeves 12—13 are a pair of driving friction wheels 19—20, the friction drive wheels 19—20 being movable longitudinally of the sleeves 12—13 and connected to the sleeves to rotate therewith, the driving friction wheels having grooves engaging feathers 21 on the sleeves. The pair of driving friction wheels 12—13 both engage the driven friction disks 10—11 at the same time at opposite sides of their axis of rotation, each of the driven disks 10—11 being driven by both of the drive wheels.

Means are provided for coupling either of the driving wheels to the power shaft 5 for rotation therewith whereby the direction of drive can be readily reversed while maintaining the drive wheels in operative engagement with the driven disks, said means also providing for the operation of the power shaft without transmitting movement to either of said driving wheels. The means for this purpose comprises clutch members 22—23, one for each of the sleeves 12—13, the clutch members being arranged at the outer ends of the sleeves and adapted to cooperate respectively with clutch faces 24—25 on said sleeves. 26 is a lever pivotally supported upon a standard 27, said lever having pivotal link connections 28—29 near one end thereof with each of said clutch members 22—23. Connected with the lever is a rod 30 which in turn is connected to a hand lever 30', the arrangement being such that either of the clutch members 22—23 may be moved into engagement respectively with the clutch faces of the sleeves 12—13 to couple either drive wheel to the power shaft, and upon the movement of one clutch member into engagement with its sleeve the other clutch member will be moved out of engagement with its sleeve. By shifting the rod 30 to move the lever 26 to an intermediate or neutral position both of the clutches are moved out of engagement with the clutch faces of the sleeves 12—13. Any suitable form of driving connection may be provided between the counter shafts 8—9 and the wheels 3 of the tractor. In the drawings, the wheels are shown connected with the countershafts by pinions 32 fixed on the counter shafts and meshing with pinions 33 fixed upon shafts 34, the shafts 34 having at their outer ends pinions 35—36 engaging respectively an internal gear 37 on one of the wheels 3 and an external gear 38 on the other wheel.

The drive wheels are adapted to be shifted longitudinally of the sleeves over the faces of the driven friction disks toward and from the axis of rotation thereof to effect speed changes. Any suitable means may be provided for synchronously shifting the driving wheels 19—20 longitudinally of the sleeves. The means shown in the drawings for this purpose comprises arms 39 having yokes 40 at one end engaging collars 41 on the driving wheels 19—20 respectively. The lower portions of the arms 39 depend below the driving wheels and have widened ends provided with threaded openings engaging respectively right and left hand threaded portions of an operating rod 43. This rod 43 has near its forward end a sprocket wheel 44 operatively connected with a hand wheel 45 by a sprocket chain 46.

While the particular construction shown illustrates the idea, obviously, in practice, it may be found advisable to employ more rapid, powerful means operating the right and left hand screws by power mechanism.

The counter shafts 8—9 are adapted to slide longitudinally in their bearings 7, and levers 47 are provided whereby the counter shafts can be shifted and the friction driven disks 12—13 moved out of engagement with the driving wheels. The driven friction disks 12—13 are yieldably maintained in driving contact with the pair of driving wheels 19—20 by fluid pressure mechanism including cylinders 48 and pistons 49 located at the outer ends of the counter shafts. The counter shafts are provided with enlarged bearing portions 8'—9' at their outer ends, and interposed between said bearing portions 8'—9' and the pistons are ball bearings 50, which may be of any suitable construction. 52—53 designate branch fluid pressure supply conduits leading to the cylinders 48 respectively from the main fluid supply reservoir 54 which in turn is connected with any suitable source of fluid pressure supply, the latter may conveniently take the form of an air tank and pump (not shown). 57 designates a gage connected with the reservoir 54 whereby the extent of the fluid pressure in the branch conduits may be readily determined, and 58 designates a cut off valve in the supply pipe 58' leading to the reservoir 54. This special means for yieldably maintaining the driven friction disks in operative engagement with the driving wheels is of particular advantage as it provides for the maintenance of a uniform balanced pressure upon the driven friction disks, the mechanism permitting the ready variation and regulation of the extent of pressure applied to the driven disks to hold the same in operative engagement with the driving wheels.

In Fig. 4 of the drawings I have illustrated a slightly modified construction. In this form of the device the power shaft 5' is supported for a limited endwise movement and clutch members 22'—23' corresponding to the clutch members 22 and 23 of the construction illustrated in Figs. 1, 2 and 3 of the drawings, are secured to the power shaft. *a* designates a clutch between one end of the power shaft 5' and the fly wheel *b* of the engine. This clutch *a* may be of any suitable construction, the arrangement is such that the power shaft 5' may be shifted longitudinally to place either of the clutch members 22'—23' in engagement with the clutch member of the adjacent sleeve, and also to be adjusted to a neutral position, with both of the clutch members 22'—23' out of operative engagement with the sleeves.

It will be noted that in the construction hereinbefore described, the drive is applied equally to the driven disks at opposite sides of their axis of rotation, the power shaft is in the form of a single or continuous shaft, and means are provided whereby the direction of drive can be readily reversed while maintaining the driving wheels in operative engagement with the driven disks. This latter means which is of a very simple and efficient nature also provides for the uncoupling of both drive wheels from the power shaft permitting the power shaft to operate without transmitting movement to the driving members.

What I claim is:

1. In a power transmission, the combination of a power shaft, a driven friction disk, a pair of driving friction wheels arranged in axial alinement to engage and drive the driven friction disk at the same time on opposite sides of its axis of rotation, gearing connecting the pair of driving wheels for rotation in opposite directions, and means for coupling either of said driving wheels to the power shaft for rotation therewith.

2. In a power transmission, the combination of a power shaft, a pair of driven friction disks disposed opposite to each other in axial alinement, a pair of driving friction wheels arranged in axial alinement to engage and drive the driven friction disks at the same time on opposite sides of their axis of rotation, gearing connecting the pair of driving wheels for rotation in opposite directions, and means for coupling either of said driving wheels to the power shaft for rotation therewith.

3. In a power transmission, the combination with a power shaft, a driven friction disk, a pair of driving friction wheels arranged in axial alinement to engage and drive the friction disk at the same time on opposite sides of its axis of rotation, gearing connecting the driving wheels for rotation in opposite directions, means for coupling either of said driving wheels to the power shaft for rotation therewith, said driving wheels being movable toward and from the axis of rotation of the driven friction disk, and means for synchronously shifting said drive wheels toward and from the axis of rotation of the driven disk.

4. In a power transmission, the combination with a power shaft, of a driven friction disk, a pair of driving friction wheels loosely mounted on the power shaft and arranged in axial alinement to engage and drive the driven disk at the same time on opposite sides of its axis of rotation, gearing connecting said drive wheels for rotation in opposite directions, and means for coupling either of said drive wheels to the power shaft for rotation therewith.

5. In a power transmission, the combination with a power shaft, of a pair of driven friction disks arranged in axial alinement, a pair of driving friction wheels loosely mounted on the power shaft and arranged in axial alinement to engage and drive the pair of driven friction disks at the same time on opposite sides of their axis of rotation, gearing connecting the drive wheels for rotation in opposite directions, and means for coupling either of said driving wheels to the power shaft for rotation therewith.

6. In a power transmission, the combination with a power shaft, of a driven friction disk, a pair of driving friction wheels arranged in axial alinement to engage the driven friction disk at the same time on opposite sides on its axis of rotation, gearing connecting the driving wheels for rotation together, and means for coupling either of said driving wheels to the power shaft for rotation therewith, said last mentioned means including separate clutch devices, a lever, and a connection between each of said clutch devices and said lever.

7. In a power transmission, the combination of a power shaft, a driven friction disk, a pair of sleeves loosely mounted on the power shaft, a pair of driving friction wheels mounted on said sleeves for movement longitudinally of the sleeves and connected with the sleeves for rotation therewith, said driving friction wheels being arranged in axial alinement to engage and drive the friction disk at the same time on opposite sides of its axis of rotation, gearing connecting the pair of driving wheels for rotation in opposite directions, and means for coupling either of said sleeves to the power shaft for rotation therewith.

8. In a power transmission, the combination of a power shaft, a pair of driven friction disks disposed opposite to each other in axial alinement, a pair of driving friction wheels arranged in axial alinement to engage the driven friction disks at the same time on opposite sides of their axis of rotation, gearing connecting the pair of driving wheels for rotation in opposite directions, means for coupling either of said driving wheels to the power shaft for rotation therewith, said driven friction disks being movable into and out of engagement with the pair of driving wheels, fluid pressure mechanism for yieldably maintaining said driven friction disks in operative engagement with the drive wheels, said fluid pressure mechanism comprising a cylinder and piston for each of said driven friction disks, a main fluid pressure supply, and branch supply conduits leading from the main supply to said cylinders, and means for shifting said driven friction disks out of engagement with the drive wheels.

9. In a power transmission, the combination of a power shaft, a pair of driven friction disks disposed opposite to each other in axial alinement, a pair of driving friction wheels arranged in axial alinement to engage the driven friction disks at the same time on opposite sides of their axis of rotation, gearing connecting the pair of driving wheels for rotation in opposite directions, means for coupling either of said driving wheels to the power shaft for rotation therewith, said driven friction disks being movable into and out of engagement with the pair of driving wheels, fluid pressure mechanism for yieldably maintaining said driven friction disks in operative engagement with the drive wheels, said fluid pressure mechanism comprising a cylinder and piston for each of said driven friction disks, a main fluid pressure supply, and branch supply conduits leading from the main supply to said cylinders, a fluid pressure gage, and means for shifting said driven friction disks out of engagement with the drive wheels.

10. In a power transmission, in combination with a power shaft, of a driven friction wheel, a pair of driving friction wheels loosely mounted on the power shaft and arranged in axial alinement to engage the driven wheel at the same time on opposite sides of its axis of rotation, gearing connecting the driving wheels for rotation in opposite directions, and means for coupling either of said drive wheels to the power shaft for rotation therewith, said means including clutch parts on the driving wheels and coöperating clutch members fixedly secured to the power shaft, the power shaft being shiftable longitudinally to position either of the clutch members into engagement with the respective clutch parts of the driving wheels.

11. In a friction power transmission, the combination of a pair of driven friction disks disposed opposite each other in axial alinement, a pair of driving friction wheels arranged in axial alinement to engage the driven friction disks at the same time on opposite sides of their axes of rotation, and fluid pressure mechanism for yieldably maintaining the driven friction disks in operative engagement with the drive wheels, said fluid pressure mechanism including a gage, and means for varying the fluid pressure.

12. In a friction power transmission, the combination of a pair of driven friction disks disposed opposite each other in axial alinement, a pair of driving friction wheels arranged in axial alinement to engage the driven friction disks at the same time on opposite sides of their axes of rotation, and fluid pressure mechanism for yieldably maintaining the friction disks in operative engagement with the drive wheels, said fluid pressure mechanism including a fluid pressure actuated device connected with each one of the driven friction disks, a main fluid pressure supply, branch supply conduits leading therefrom to the fluid pressure actuated devices of the respective driven disks, and means for varying the fluid pressure of the branch conduits and a gage for determining the degree of pressure supplied to said device.

13. In a friction power transmission, the combination with drive and driven friction disk elements, of fluid pressure mechanism for yieldably maintaining one of said friction disks in engagement with the other, said fluid pressure mechanism including means for varying the degree of pressure.

14. In a friction power transmission, the combination with drive and driven friction disk elements, of fluid pressure mechanism for yieldably maintaining one of said friction disks in engagement with the other, said fluid pressure mechanism including a gage, and means for regulating the pressure.

In testimony whereof I hereunto affix my signature in the presence of two witnesses.

THOMAS W. GRAHAM.

Witnesses:
    WILL DOUGLAS,
    J. G. STUART.